US008352610B2

(12) United States Patent  (10) Patent No.: US 8,352,610 B2
Silva-Lepe et al.  (45) Date of Patent: Jan. 8, 2013

(54) MATCHING INTEREST AND AVAILABILITY OF SERVICES IN DISTRIBUTED FEDERATED SERVICE DOMAINS

(75) Inventors: Ignacio Silva-Lepe, Putnam Valley, NY (US); Arun Kwangil Iyengar, Yorktown Heights, NY (US); Thomas Arthur Mikalsen, Cold Spring, NY (US); Isabelle M. Rouvellou, New York, NY (US); Revathi Subramanian, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 12/625,806

(22) Filed: Nov. 25, 2009

(65) Prior Publication Data
US 2011/0125903 A1 May 26, 2011

(51) Int. Cl.
*G06F 15/16* (2006.01)
(52) U.S. Cl. ........ 709/226; 709/206; 709/223; 370/235; 370/254
(58) Field of Classification Search .................. 709/226, 709/206, 223; 370/235, 254
See application file for complete search history.

(56) References Cited

U.S. PATENT DOCUMENTS

| | | | |
|---|---|---|---|
| 5,958,009 A | 9/1999 | Friedrich et al. | |
| 6,289,382 B1 | 9/2001 | Bowman-Amuah | |
| 7,194,543 B2* | 3/2007 | Robertson et al. | 709/226 |
| 2003/0033288 A1* | 2/2003 | Shanahan et al. | 707/3 |
| 2004/0098447 A1* | 5/2004 | Verbeke et al. | 709/201 |
| 2004/0162871 A1* | 8/2004 | Pabla et al. | 709/201 |
| 2004/0167959 A1* | 8/2004 | Doyle et al. | 709/203 |
| 2005/0086300 A1* | 4/2005 | Yeager et al. | 709/204 |
| 2006/0190605 A1* | 8/2006 | Franz et al. | 709/226 |
| 2007/0097885 A1* | 5/2007 | Traversat et al. | 370/254 |
| 2007/0201366 A1* | 8/2007 | Liu | 370/235 |
| 2007/0294668 A1* | 12/2007 | Mohindra et al. | 717/120 |
| 2008/0005651 A1* | 1/2008 | Grefenstette et al. | 715/500 |
| 2010/0057835 A1* | 3/2010 | Little | 709/203 |

OTHER PUBLICATIONS

H.H. Huang et al., "You Can't Always Get What You Want: Achieving Differentiated Service Levels with Pricing Agents in a Storage Grid," IEEE/WIC/ACM International Conference on Web Intelligence, Nov. 2007, pp. 123-131, Fremont, California.

D. Rocco et al., "Domain-Specific Web Service Discovery with Service Class Descriptions," IEEE International Conference on Web Services, Jul. 2005, pp. 481-488.

A. Friday et al., "Supporting Service Discovery, Querying and Interaction in Ubiquitous Computing Environments," ACM International Workshop on Data Engineering for Wireless and Mobile Access, 2001, pp. 7-13, Santa Barbara, California.

M.P. Papazoglou et al., "Service Oriented Architectures: Approaches, Technologies and Research Issues," The VLDB Journal, Jul. 2007, pp. 389-415, vol. 16, No. 3.

* cited by examiner

*Primary Examiner* — Tesfay Yohannes
(74) *Attorney, Agent, or Firm* — Preston J. Young; Ryan, Mason & Lewis, LLP

(57) ABSTRACT

Systems, methods, apparatus and articles of manufacture are disclosed for tracking, propagation and matching of messages pertaining to the interest in and availability of services across autonomous service domains. In one embodiment of the invention, a system of distributed, federated service domains in a service-oriented environment is provided wherein each service domain comprises: a plurality of locally provided services; a plurality of service requesters; and a service registry comprising descriptions of: one or more locally provided services; and one or more requested services, each of the requested services being one of: a fulfilled reference to a foreign service; and an unfulfilled reference to a foreign service.

21 Claims, 8 Drawing Sheets

MATCHING INTEREST AND AVAILABILITY OF SERVICES IN DISTRIBUTED FEDERATED SERVICE DOMAINS

FIELD OF THE INVENTION

The present invention relates generally to the automatic connectivity of services across autonomous service domains, and more particularly relates to the tracking, propagation and matching of messages pertaining to the interest in and availability of services across autonomous service domains.

BACKGROUND OF THE INVENTION

Service Oriented Architecture (SOA) is a popular building block for open-standards based information technology (IT) today, see, e.g., E. Newcomer et al., "Understanding SOA with Web Services," Addison Wesley (ISBN 0-321-18086-0), 2005, the disclosure of which is incorporated by reference herein. In general, as is known in computing environments, SOA provides a set of governing concepts used during phases of system (e.g., application) development and integration. Such an architecture packages functionality as interoperable services. Software modules provided as a service can be integrated or used by several domains and/or enterprises, even if their respective client systems are substantially different. Further, it is known that, rather than defining an application programming interface (API), SOA defines the interface in terms of protocols and functionality. Still further, SOA separates functions into distinct units, or services, which developers make accessible over a network in order that users can combine and reuse them in the production of applications. These services communicate with each other by passing data from one service to another, or by coordinating an activity between two or more services.

In the context of intra- and inter-enterprise service connectivity, service domains can be defined that delimit the visibility and connectivity for collections of services and within which services can display Enterprise Service Bus (ESB) properties, including dynamic selection and location transparency. As is known, ESB is a software infrastructure that facilitates application integration and may be used to implement an SOA. While ESB technology is well-known in the art, general reference may be made to the text: David A. Chappell, Enterprise Service Bus, O'Reilly, 2004, the disclosure of which is incorporated by reference herein. The ESB property known as dynamic selection allows the provider of a service to be selected at request time via mediated late binding. The ESB property known as location transparency allows provider services to change their endpoint address without impacting requester services. A service domain may be realized in terms of one or more ESBs, such as WebSphere ESB (Websphere is a trademark of International Business Machines Corporation, Armonk N.Y.). A service domain relies on a service registry, defined within the domain's scope, to keep track of services within its scope, and to provide ESB properties.

In this context, federations can be defined as aggregate service domains that allow connectivity of services across service domains via the introduction of service proxies. A service proxy is a service connectivity artifact that allows services to communicate across domains. A service domain federation cannot be assumed to define a single, centralized service registry. A further assumption is that it is not desirable for each service domain registry to contain entries for every service in every domain in the federation. Thus, if a service provider moves across domains, connectivity must be re-established by re-introducing proxies to the service provider's new location into every domain where an interested service requester exists.

SUMMARY OF THE INVENTION

Principles of the invention provide systems, methods, apparatus and articles of manufacture for tracking, propagation and matching of messages pertaining to the interest in and availability of services across autonomous service domains.

In one embodiment of the invention, a system of distributed, federated service domains in a service-oriented environment is provided wherein each service domain comprises: a plurality of locally provided services; a plurality of service requesters; and a service registry comprising descriptions of: one or more locally provided services; and one or more requested services, each of the requested services being one of: a fulfilled reference to a foreign service; and an unfulfilled reference to a foreign service; wherein each service domain is implemented via one or more processor devices.

In another embodiment of the invention, a method for matching interest and availability of services in a service-oriented environment comprises the following steps. Two or more service domains are instantiated, wherein each service domain is configured to send and receive interest, availability and connectivity messages to and from other service domains. A service domain sends an availability message for a service s1 to other domains, wherein the availability message comprises a description of s1 to match with, and a reference to its domain, and wherein the service domain locally registers availability of s1, and waits to hear for interest in s1. The service domain receives an interest message, wherein the interest message comprises a description of s1 to match with, and a reference to the sender domain, the service domain then sending a connectivity message to the sender domain, if service s1 is locally available, where the connectivity message comprises a proxy to the locally provided service s1. The service domain sends an interest message for a service s2 to other domains, wherein the interest message comprises a description of s2 to match with, and a reference to its domain, wherein the service domain locally registers an unfulfilled reference to s2, and waits to hear for a connectivity message for s2. The service domain receives an availability message, wherein the availability message comprises a description of s2 to match with, and a reference to the sender domain, wherein the service domain then sends an interest message for service s2 to sender domain, if an unfulfilled reference to s2 is registered locally, and wherein the interest message comprises a description of s2 to match with, and a reference to its domain. The service domain receives a connectivity message, wherein the connectivity message comprises a proxy to the foreign provided service s2, wherein the service domain then replaces the unfulfilled reference to s2 with the proxy to s2 in its local registry. Each of the steps is implemented via one or more processor devices.

In a further embodiment of the invention, a method for matching negative interest and negative availability of services in a service-oriented environment comprises the following steps. Two or more service domains are instantiated, wherein each service domain is configured to send and receive negative availability messages to and from other service domains. A service domain sends a negative availability message for a service to other domains, wherein the negative availability message comprises a description of the service to match with, and a reference to its domain. The service domain receives a negative availability message, wherein the negative availability message comprises a description of a service to match with, and a reference to the sender domain, and wherein the service domain then replaces a fulfilled reference to the service with an unfulfilled reference to the service, if a fulfilled reference to the service is registered locally, and sends an interest message for the service to other domains. Furthermore, when negative interest in a service occurs in the service domain, the service domain preferably removes its reference to the service, fulfilled or unfulfilled, from its local registry, if said reference to the service is registered locally. Each of the steps is implemented via one or more processor devices.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
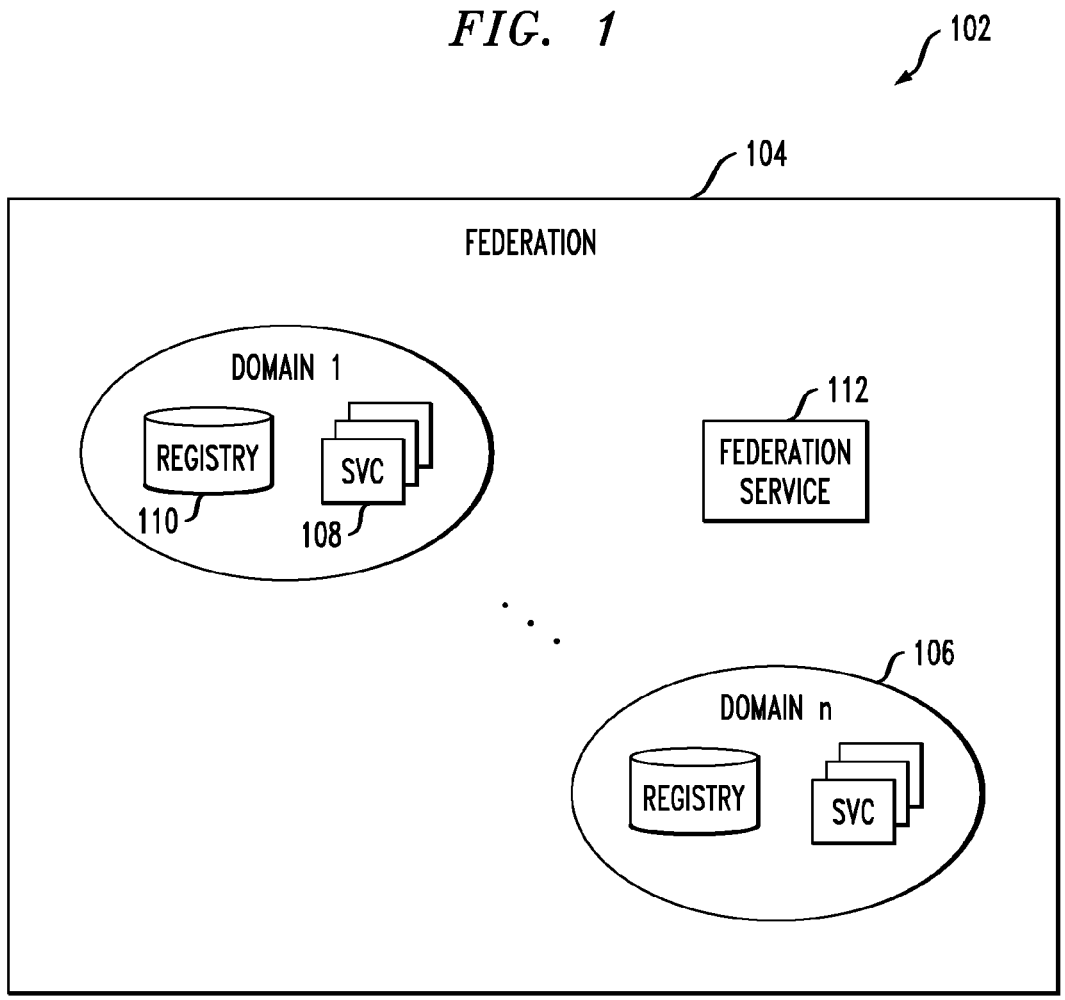
FIG. 1 shows an exemplary federation environment that aggregates any number of service domains, according to an embodiment of the invention.

The foregoing and further features of the present invention will be more readily understood, by way of an example only and without limitation to the scope of the invention, from the following description of a preferred embodiment with reference to the drawings.

Illustrative principles of the invention introduce a method for matching interest in and availability of services in a system of distributed, federated service domains. This method maintains the invariant that each service domain's registry contains entries for: (a) services provided within the domain's scope; and (b) services for which there are requesters within the domain's scope, expressed as either a reference to the existing provider service, or as a reference to be fulfilled by the method when the provider service becomes available. This invariant is maintained by means of a protocol of interest and availability messages exchanged across service domains.

Advantages of this invention include, by way of example only: (a) ESB properties, such as dynamic selection and location transparency, are enabled at the federation level; and (b) a requester service is able to express interest in a provider service, which may be fulfilled asynchronously and automatically if the provider service is not immediately available.

As used herein, the term "enterprise" is understood to broadly refer to any entity that is created or formed to achieve some purpose, examples of which include, but are not limited to, an undertaking, an endeavor, a venture, a business, a concern, a corporation, an establishment, a firm, an organization, or the like.

Also, the terms "local" and "foreign" with regard to services are relatively defined whereby a "local" service is one that is typically available in a given domain, and a "foreign" service is one that is not typically available within that given domain, i.e., is remotely located in another domain.

By way of one example that illustrates the service domain concept, consider a portfolio manager application that uses a stock quote service to provide timely stock price information to its users. Assuming both applications (i.e., the portfolio manager application and the application that provides the stock quote service) are connected via an ESB, the portfolio manager is able to find and invoke the stock quote service without paying much attention to its endpoint address or whether or not it is available. Likewise, the stock quote service is able to be deployed and re-deployed, and even multiple versions of it made available for differentiated quality of service or performance reasons, without worrying about the impact these changes may have on its consumers.

Let us now imagine a situation where the portfolio manager and the stock quote service are located in independent and autonomous domains. This can occur due to administrative choices; for instance, the stock quote service may be provided by a financial services department on a separate domain. This can also occur because a better implementation may be available on a platform provided by a different vendor. In this case, in order to provide a bridge, and to handle the differences across domains, it is necessary to add a proxy to the stock quote service into the domain of the portfolio manager. From the point of view of the portfolio manager, the stock quote service proxy can be found and invoked like the actual service.

In FIG. 1, an exemplary environment 102 according to one embodiment of the invention is shown. The environment 102 includes a federation 104 that aggregates any number of service domains (e.g., domains 1 . . . n, where n is an integer greater than one). A service domain 106 defines a scope for the management for any number of services 108, that is, a service domain delimits the visibility and connectivity of any number of services. A service domain relies on a service registry 110 to keep track of the services it manages. A federation may also include a federation service 112 that maintains a record of the collection of service domains in the federation.

Figure 2:
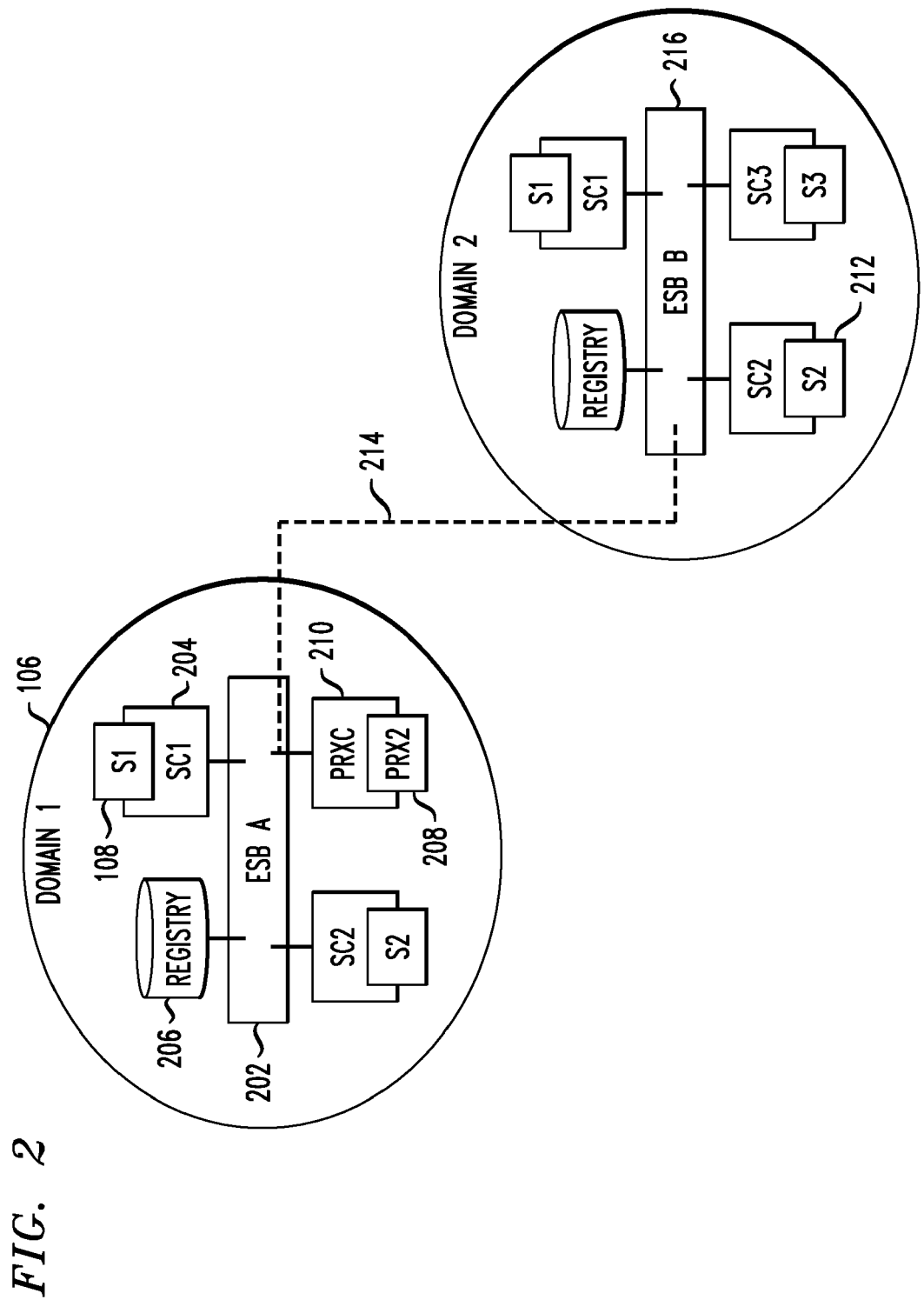
FIG. 2 shows two service domains that are realized by enterprise service domains, according to an embodiment of the invention.

In a preferred embodiment of the invention, a service domain 106 may be realized by one or more instances of an ESB. In FIG. 2, service domain 1 (106) is realized by ESB A 202. An ESB in turn is realized in terms of any number of instances of a service container 204, which provides the necessary infrastructure for a service 108 to interact with other services. A service container 204 provides interface abstraction, destination abstraction and data abstraction that result in properties such as dynamic selection and location transparency to be available to services. A service container 204 uses a service registry 206, given by its ESB, to perform its interface, destination and data abstraction functions. In a preferred embodiment of the invention, a service domain's registry is given by the ESB that realizes the service domain. To allow services to communicate with another service in a separate domain, a service proxy 208 is added to the local domain to provide a local implementation of the foreign (non-local or remote) service, in this case, service 2 (212) in domain 2. A service proxy uses a particular kind of service container 210 that also behaves as a cross-domain bridge to provide cross-ESB inter-operation. In particular, a service proxy embodies the necessary logic to support connectivity with an ESB in a foreign domain, this is illustrated by the dashed line 214 connecting the service proxy container 210 with the foreign ESB B 216.

Figure 3:
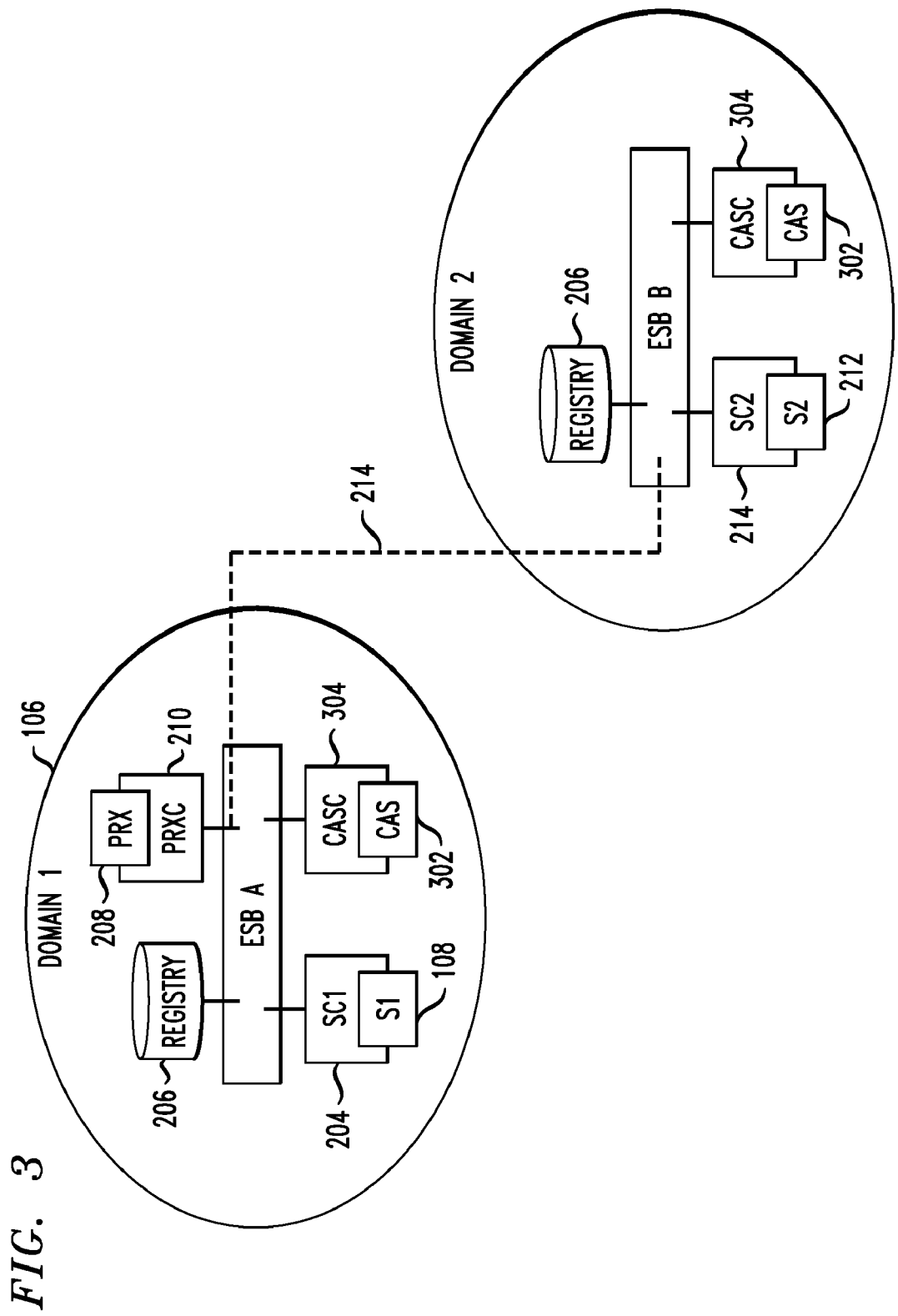
FIG. 3 shows a connectivity automation service which, in conjunction with a connectivity automation service container embodies a protocol of interest and availability messages exchanged across service domains, according to an embodiment of the invention.

In accordance with illustrative principles of the invention, a service proxy for a given service is added to and removed from a domain where the service is required as a byproduct of a successful match of interest and availability messages being exchanged. FIG. 3 shows a Connectivity Automation Service (CAS) 302 which, in conjunction with a CAS Container (CASC) 304, embodies a protocol of interest and availability messages exchanged across service domains. Typically, a service domain contains one instance of the CAS and its CASC. This instance pair implements both the interest aspect and the availability aspect of the protocol. For convenience, this instance pair is henceforth expressed as CAS/CASC. When a service provider 212 is made available in a domain, its service container 214 notifies the CAS/CASC to create an entry for it in the service registry 206 and to initiate the availability aspect of the protocol. When a service 108 requires a service provider 212 in a foreign domain, its service container 204 notifies the CAS/CASC to initiate the interest aspect of the protocol.

In accordance with illustrative principles of the invention, a service description may include:
- functional interface, for instance, an interface in the Web Services Definition Language (WSDL).
- non-functional criteria, for instance, quality of service requirements, such as reliability, availability, or security expectations.
- informal semantics, for instance, user defined tags, such as those found on on-line social communities (e.g., flickr).

In accordance with illustrative principles of the invention, an entry in a domain service registry may be:
- a reference to a service required in the scope of the domain.
- an entry for a service provided in the scope of the domain.

A reference to a required service is considered to be fulfilled if it contains an endpoint to a proxy to a provided service whose description matches that of the required service. Otherwise, a reference to a required service is considered to be unfulfilled. More specifically:
- a fulfilled reference includes:
- a description of the required service.
- the endpoint of required service proxy.
- an unfulfilled reference includes a description of the required service.

An entry for a provided service may include:
- a description of the provided service.
- a list of dependent CAS/CASC endpoints, each CAS/CASC corresponding to a service domain that contains in its registry a fulfilled reference including a description of this provided service.

Each aspect of the protocol operates on a per-service basis. That is, the interest aspect operates on a per-required service reference basis, and the availability aspect operates on a per-provided service basis.

In a preferred embodiment of the invention, a CASC is aware of the federation service 112, and obtains from it a listing of the collection of service domains in the federation.

In one embodiment, a locally provided service is composed with a service requester to form a mediation s/r, where s is a provided service component and r is a service requester component.

In accordance with illustrative principles of the invention, the following message types are exchanged by the interest and availability aspects of the protocol:
- Interest.
- Availability.
- Connectivity.
- Negative Availability.

In a preferred embodiment of the invention, each protocol message includes:
- A description D of the service the message pertains to; for convenience, messages are henceforth expressed as a function of D, for example, Interest(D).
- The endpoint of the CAS/CASC that issued the message.

In addition, a Connectivity message also includes a proxy to the service the message pertains to; in particular, this proxy includes a reference to the endpoint of the service in the domain where it is provided and available.

Figure 4:
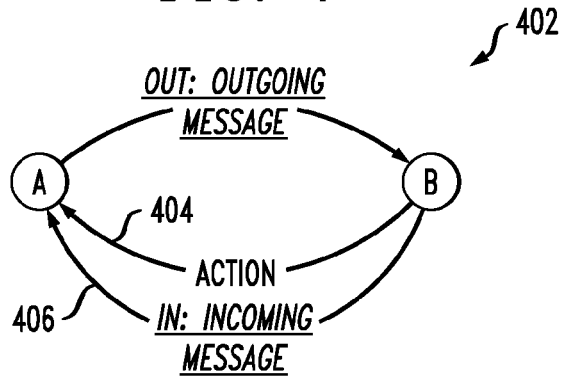
FIG. 4 shows a sample transition diagram, according to an embodiment of the invention.

For a given required service reference, the fulfilled and unfulfilled types the reference may take are viewed as states the reference may be in. Likewise, a given provided service may or may not be in an available state. Thus, to describe the behavior of a CAS/CASC with respect to each aspect of the protocol, we use a state transition diagram. FIG. 4 illustrates a sample transition diagram 402. Transitions may be labeled with actions or messages. Actions 404 are plain text whereas messages 406 on a transition are indicated by underlined italics and are prefixed with "in:" to signal message receipt, and "out:" to signal message transmission. In the description of the protocol, when a Message(D) arrives, we say that D is in a given state S if the registry contains a description D', or a reference including D', where D' matches D, and D' is in state S.

Figure 5:
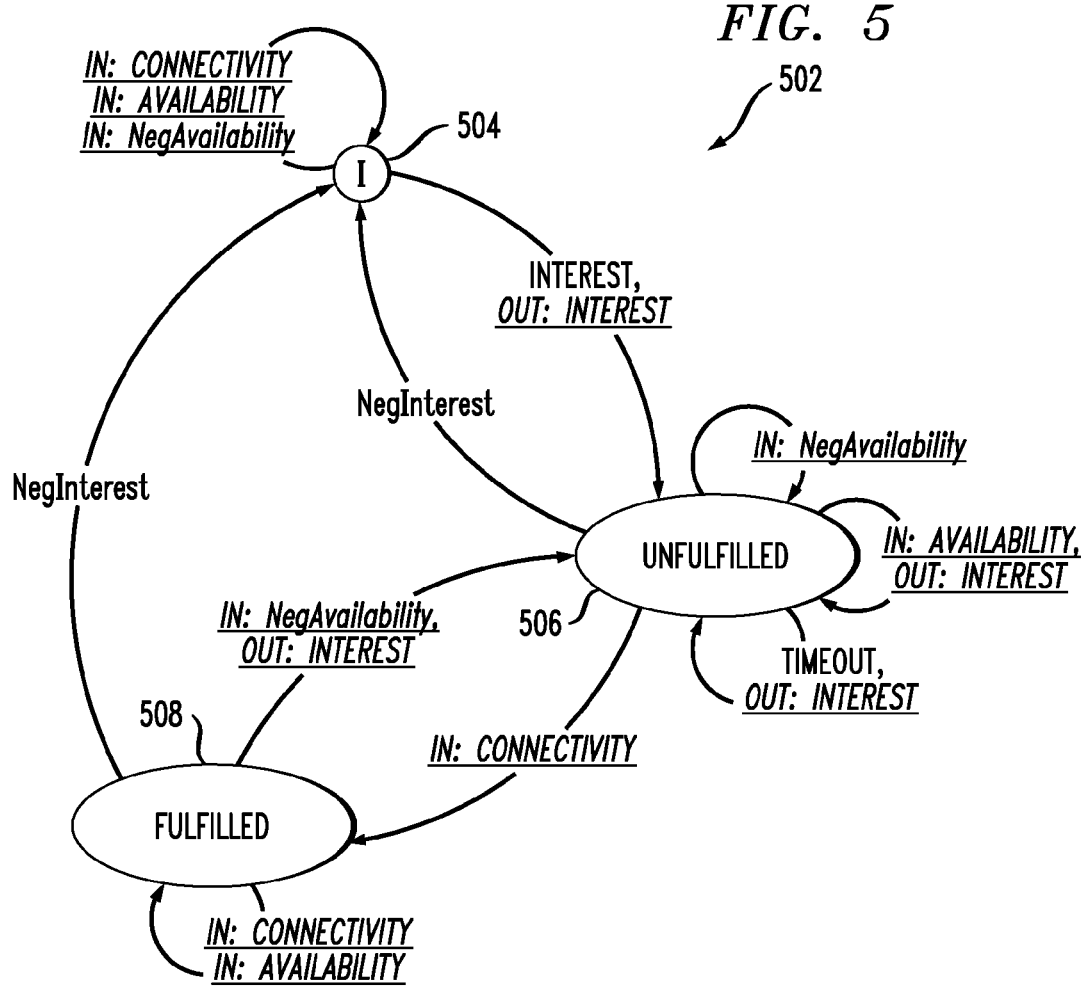
FIG. 5 shows a state transition diagram for an interest aspect of a protocol, according to an embodiment of the invention.

FIG. 5 illustrates the state transition diagram 502 for the interest aspect of the protocol. A required reference that is not known to the CAS/CASC is in the initial state 504.

If a Connectivity(D), Availability(D) or NegAvailability (D) message is received, and D is in the initial state 504, then the CAS/CASC takes no action and remains in the initial state for D.

If interest on a required service with a given description D is notified to the CAS/CASC, and D is in the initial state 504, then the CAS/CASC creates an unfulfilled reference that includes D, adds this reference to the registry, and sends out an Interest(D) message to the CAS/CASC in each service domain listed by the federation service 112; at this point, the CAS/CASC is in the Unfulfilled state 506 for D.

If a Connectivity(D) message C is received, and D is in the Unfulfilled state 506, the CAS/CASC replaces the unfulfilled reference with a fulfilled reference that includes the required service proxy included in C; at this point, since the reference to the required service is fulfilled, the CAS/CASC is in the Fulfilled state 508 for D.

If a NegAvailability(D) message is received, and D is in the Unfulfilled state 506, then the CAS/CASC takes no action and remains in the initial state for D.

If an Availability(D) message is received, and D is in the Unfulfilled state 506, then the CAS/CASC sends out an Interest(D) message to the CAS/CASC that issued the message and remains in the Unfulfilled state 506 for D.

A timeout may occur for a service description D that is in the Unfulfilled state 506. When this timeout occurs, the CAS/CASC sends out an Interest(D) message to the CAS/CASC in each service domain listed by the federation service 112, and remains in the Unfulfilled state 506 for D.

If a Connectivity(D) or Availability(D) message is received, and D is in the Fulfilled state 508, then the CAS/CASC takes no action and remains in the Fulfilled state 508 for D.

If a NegAvailability(D) is received, and D is in the Fulfilled state 508, the CAS/CASC replaces the fulfilled reference with an unfulfilled reference that includes D, and sends out an Interest(D) message to the CAS/CASC in each service domain listed by the federation service 112; at this point, since the reference to the required service is unfulfilled, the CAS/CASC is in the Unfulfilled state 508 for D.

When a service described by D is in the Unfulfilled or Fulfilled states, negative interest may be notified to the CAS/CASC. When this occurs, the CAS/CASC removes the fulfilled or unfulfilled reference including D from the registry; at this point the CAS/CASC is in the initial state for D.

Figure 6:
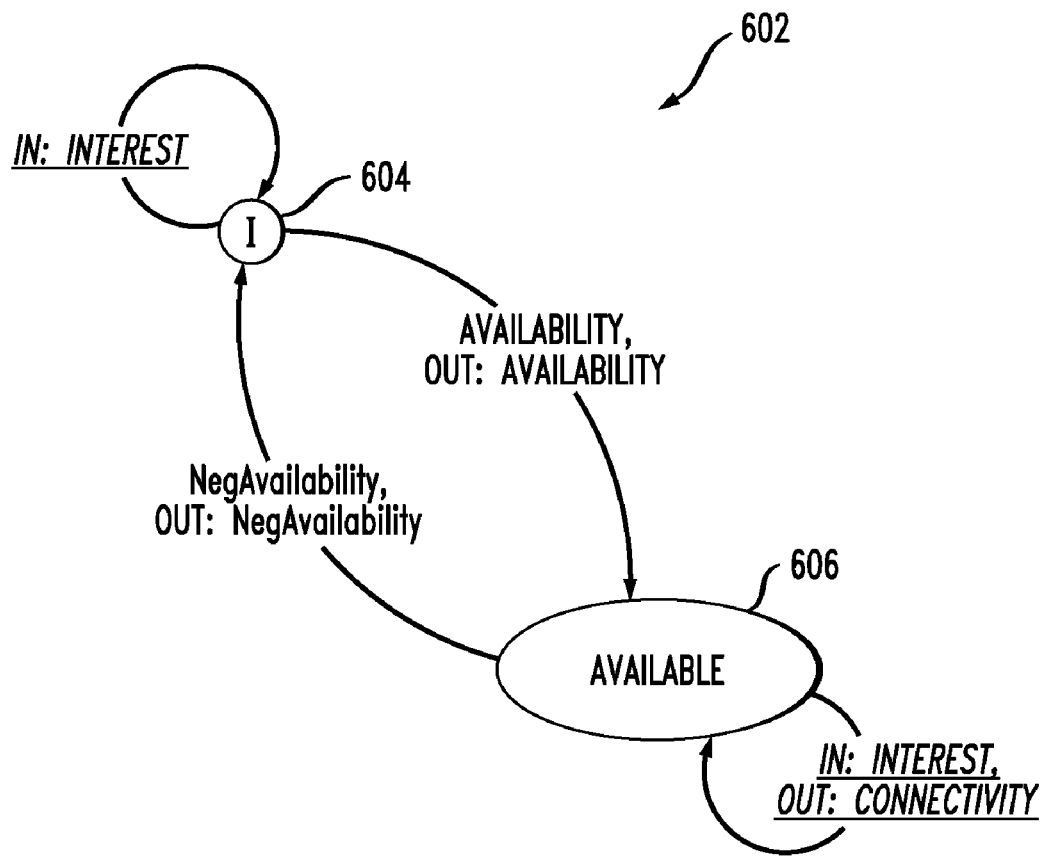
FIG. 6 illustrates a state transition diagram for an availability aspect of a protocol, according to an embodiment of the invention.

FIG. 6 illustrates the state transition diagram 602 for the availability aspect of the protocol. A provided service that is not known to the CAS/CASC is in the initial state 604.

If an Interest(D) message is received, and D is in the initial state 604, then the CAS/CASC takes no action and remains in the initial state for D.

If availability of a provided service with a given description D is notified to the CAS/CASC, and D is in the initial state 604, then the CAS/CASC sends out an Availability(D) message to the CAS/CASC in each service domain listed by the federation service 112; at this point, the CAS/CASC is in the Available state 606 for D.

If an Interest(D) message is received, and D is in the Available state 606, then the CAS/CASC creates a Connectivity(D) message C that includes a proxy to the provided service described by D, sends C to the CAS/CASC that issued the Interest(D) message; the CAS/CASC also adds the endpoint of the CAS/CASC that issued D to the list of dependent CAS/CASC endpoints for the provided service described by D; finally, the CAS/CASC remains in the Available state 606 for D.

In one embodiment, the service domain sends the availability message for the service s, where the service s is composed into a mediation s/r, after interest for the mediation's requester component r is fulfilled, such that when the service s is a component of a mediation s/r, the service domain sends interest for r first, and availability of s is not sent until the service domain receives a connectivity message for r.

When a service described by D is in the Available state, negative availability may be notified to the CAS/CASC. When this occurs, the CAS/CASC sends out a NegAvailability(D) message to each element in the list of dependent CAS/CASC endpoints for the service described by D; at this point, the CAS/CASC is in the initial state 604 for D.

Figure 7:
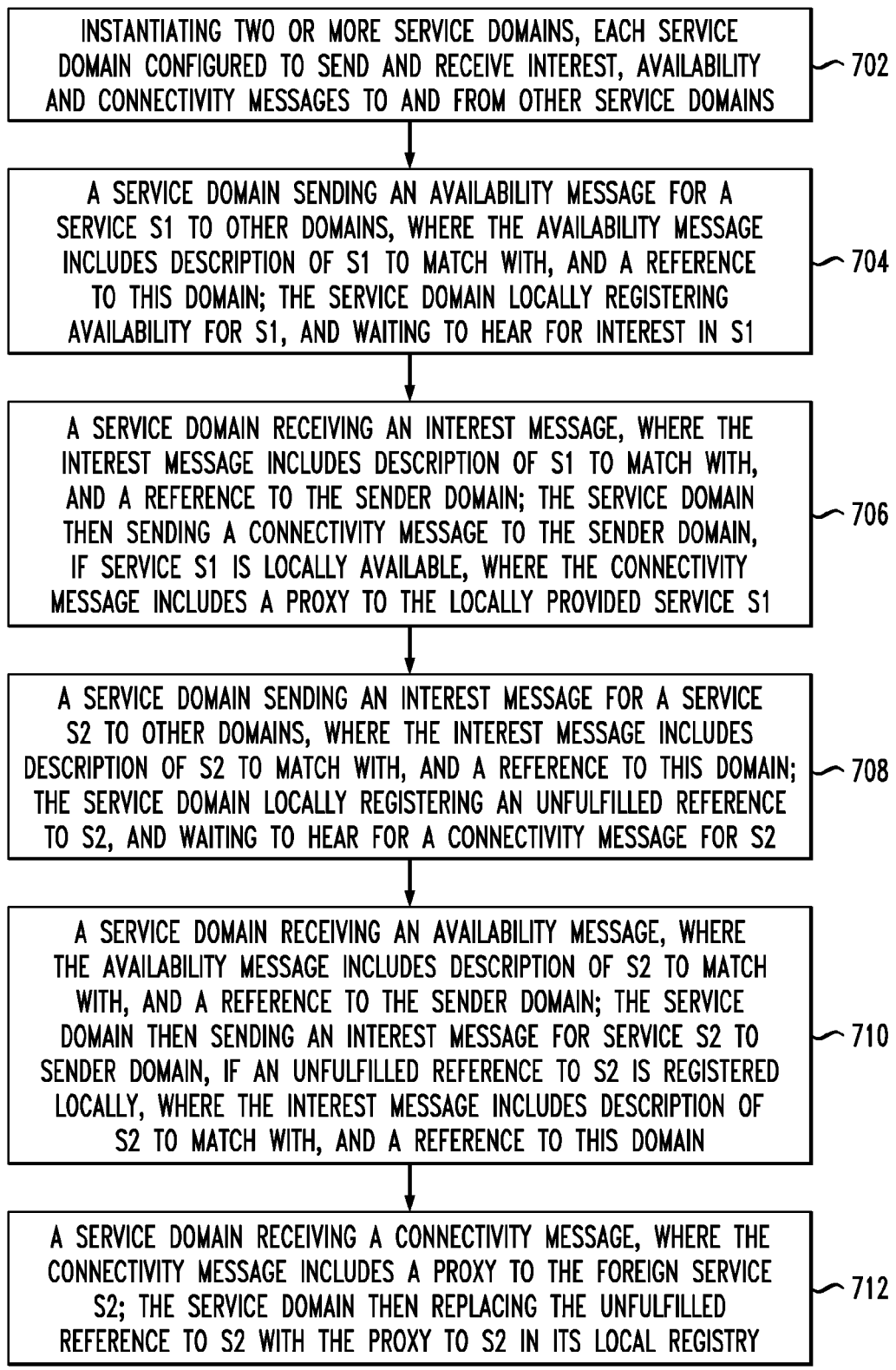
FIG. 7 shows a method for matching interest and availability of services in a service-oriented environment, according to an embodiment of the invention.

FIG. 7 shows a method 700 for matching interest and availability of services in a service-oriented environment.

In step 702, two or more service domains are instantiated. Each service domain is configured to send and receive interest, availability and connectivity messages to and from other service domains.

In step 704, a service domain sends an availability message for service s1 to other domains. The availability message includes a description of s1 to match with, and a reference to this (its) domain. The service domain locally registers availability of s1, and waits to hear for interest in s.

In step 706, the service domain receives an interest message. The interest message includes a description of s1 to match with, and a reference to the sender domain. The service domain then sends a connectivity message to the sender domain, if service s1 is locally available, where the connectivity message includes a proxy to the locally provided service s1.

In step 708, the service domain sends an interest message for service s2 to other domains. The interest message includes a description of s2 to match with, and a reference to this (its) domain. The service domain locally registers an unfulfilled reference to s2, and waits to hear for a connectivity message for s2.

In step 710, the service domain receives an availability message. The availability message includes description of s2 to match with, and a reference to the sender domain. The service domain then sends an interest message for service s2 to the sender domain, if an unfulfilled reference to s2 is registered locally, where the interest message includes description of s2 to match with, and a reference to this (its) domain.

In step 712, the service domain receives a connectivity message. The connectivity message includes a proxy to the foreign service s2. The service domain then replaces the unfulfilled reference to s2 with the proxy to s2 in its local registry.

Note that while service s1 and service s2 may be different services, they may also be different instances or versions of the same service.

Figure 8:
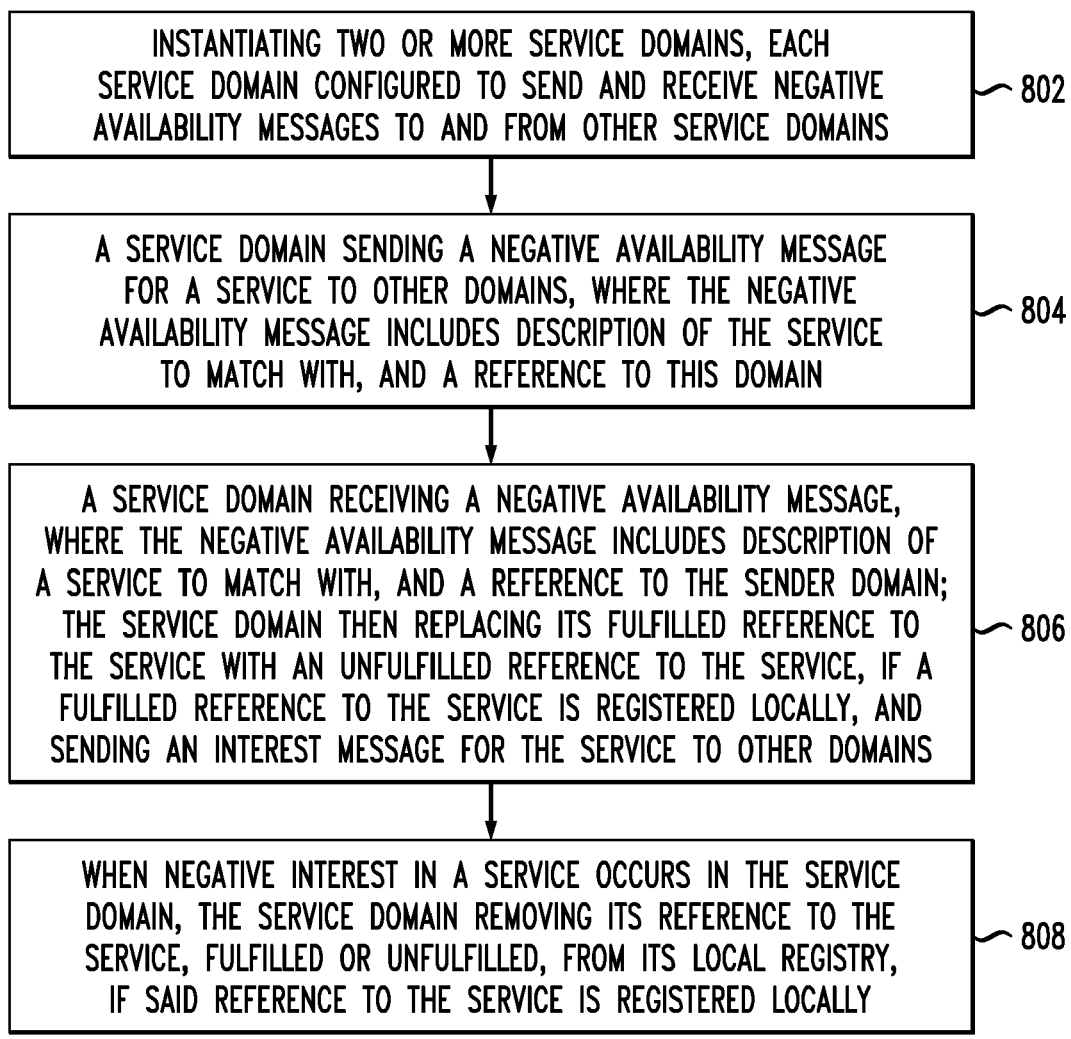
FIG. 8 shows a method for matching negative interest and negative availability of services in a service-oriented environment, according to an embodiment of the invention.

FIG. 8 shows a method 800 for matching negative interest and negative availability of services in a service-oriented environment.

In step 802, two or more service domains are instantiated. Each service domain is configured to send and receive negative availability messages to and from other service domains.

In step 804, a service domain sends a negative availability message for a service to other domains. The negative availability message includes a description of the service to match with, and a reference to this (its) domain.

In step 806, the service domain receives a negative availability message. The negative availability message includes a description of a service to match with, and a reference to the sender domain. It is to be understood that the service of the received negative availability message may be the same service as referred to in the sent negative availability message (step 804), or it may be a different service or a different version or instance of the same service. In any event, upon receipt of the negative availability message, the service domain then replaces its fulfilled reference to the service with an unfulfilled reference to the service, if a fulfilled reference to the service is registered locally, and sends an interest message for the service to other domains.

In step 808, when negative interest in a service occurs in a service domain, the service domain removes its reference to the service, fulfilled or unfulfilled, from its local registry, if the reference to the service is registered locally.

The following advantages of this invention are now described, by way of example only: (a) ESB properties, such as dynamic selection and location transparency, are enabled at the federation level; and (b) a requester service is able to express interest in a provider service, which may be fulfilled asynchronously and automatically if the provider service is not immediately available.

Dynamic selection. In a single domain, a consumer determines the target endpoint to invoke using the registry. The registry may contain more than one endpoint for a given service, to allow for load balancing or differentiated quality of service. If this is the case, the consumer can use a load balancing algorithm or application-specific criteria to determine which endpoint to actually use.

In a multiple domain scenario, a consumer looks up a required service reference in the registry. If this reference is fulfilled, it contains a current proxy to connect with the provider service. If the required service reference can be fulfilled multiple times, then the consumer is aware of multiple proxies and can use load balancing or application-specific criteria to determine the proxy to use.

Notice that the use of a required service reference, which may be fulfilled multiple times, in conjunction with interest and availability dissemination and matching, and proxy handling automation, allow a consumer to regard dynamic selection across domains as equivalent to dynamic selection within a single domain.

Location transparency. In a single domain, when a provider service changes location, its entry in the registry gets updated with the latest endpoint. Thus, when a consumer determines the target endpoint to invoke, it will always be able to invoke the provided service at its current location. In a multiple domain scenario, when a provided service changes location from one domain to another, it does so by becoming unavailable in the old domain and becoming available in the new domain. This translates into the proxy to the old domain being removed from the required service reference in the consumer domain, and the proxy to the new domain being added. This in turn means that when the consumer looks up the required service reference, it will always find a proxy to the current domain, modulo any time delays which, as it turns out, may be handled via asynchronous connectivity.

Notice that, via the use of interest and availability dissemination and matching, and proxy handling automation, a proxy in a consumer domain is removed and re-added to its required service reference as a result of the corresponding provider service being removed from an old domain and added to a new domain. Thus, from the point of view of a consumer service, the location of a provider service in any given domain becomes transparent.

Asynchronous connectivity. In a single domain, if a provided service is not ready to handle requests, the consumer may be able to block until the provided service becomes ready, or it may provide an asynchronous interface to wait for the provider to become ready without blocking the consumer. If a response is required, the consumer may obtain it at a later time.

In a multiple domain scenario, a required service may not be available in any domain at the time of a consumer request. Here, the consumer may be able to block or use an asynchronous interface as well. Furthermore, in this case, the consumer waits for the required service reference to be fulfilled by a connectivity message that results from interest finding availability.

Notice that, via the use of interest dissemination and the subsequent proxy handling automation, a consumer is able to regard unavailability of a provided service in other domains as the lack of readiness of the required service.

As will be appreciated by one skilled in the art, principles of the present invention may be embodied as a system, method or computer program product. Accordingly, principles of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, principles of the present invention may take the form of a computer program product embodied in one or more computer readable medium (s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for principles of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Principles of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1 through 8, the diagrams in the figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1-8, can also include, as described herein, provision of a system, wherein the system includes distinct modules (e.g., modules comprising software, hardware or software and hardware). By way of example only, the modules may include: an ESB module; a service container module; a service registry module, a service proxy module, a CAS module, and a CASC module. These and other modules may be configured, for example, to perform the steps of described and illustrated in the context of FIGS. 1-8.

Figure 9:
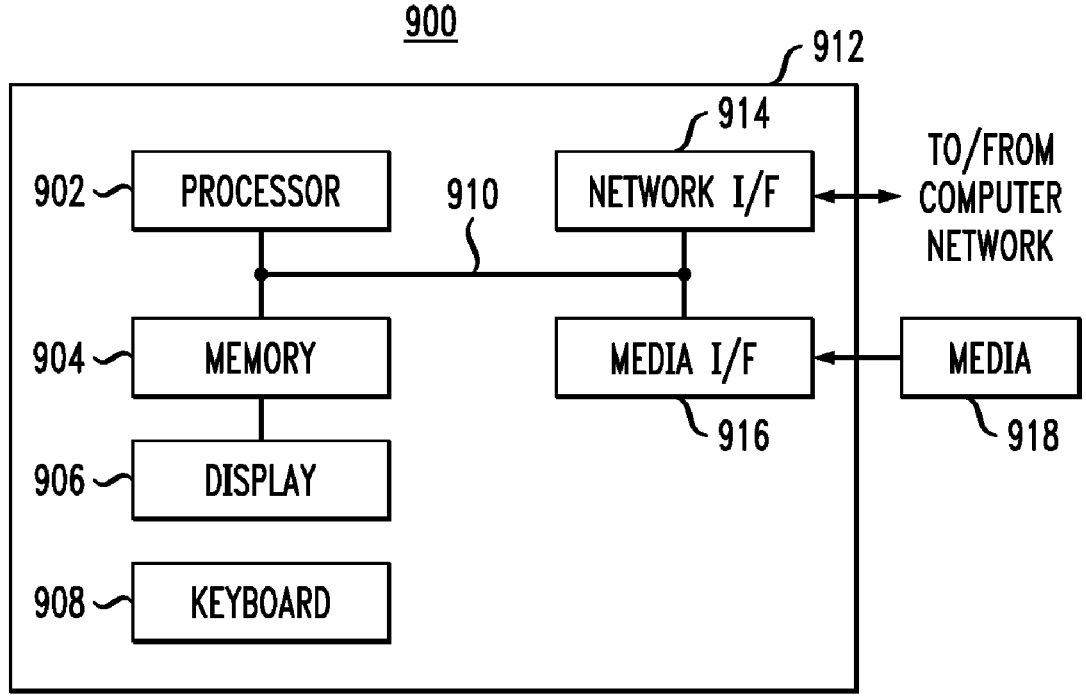
FIG. 9 shows a computing system in accordance with which one or more techniques described herein are implemented, according to an embodiment of the invention.

One or more embodiments can make use of software (or any form of instruction code) running on a general purpose computer or workstation. With reference to FIG. 9, such an implementation 900 employs, for example, a processor 902, a memory 904, and an input/output interface foamed, for example, by a display 906 and a keyboard 908. The techniques of the invention can be implemented on one or more than one such system 900.

The term "processor" as used herein is intended to include any processing or processor device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer).

The processor 902, memory 904, and input/output interface such as display 906 and keyboard 908 can be interconnected, for example, via bus 910 as part of a data processing unit 912. Suitable interconnections, for example, via bus 910, can also be provided to a network interface 914, such as a network card, which can be provided to interface with a computer network, and to a media interface 916, such as a diskette or CD-ROM drive, which can be provided to interface with media 918.

A data processing system suitable for storing and/or executing program code can include at least one processor 902 coupled directly or indirectly to memory elements 904 through a system bus 910. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 908, display 906, pointing device, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A system of distributed, federated service domains in a service-oriented environment, each service domain comprising:
   a plurality of locally provided services;
   a plurality of service requesters; and
   a service registry comprising descriptions of: one or more locally provided services; and one or more requested services, each of the requested services being one of: a fulfilled reference to a foreign service; and an unfulfilled reference to a foreign service;
   wherein each service domain is implemented via one or more processor devices;

wherein an unfulfilled requested service reference in the service registry is fulfilled once or multiple times; and wherein the description of a service comprises a function interface, a non-functional criterion, or informal semantics.

2. The system of claim 1, wherein a federation service maintains a record of the distributed, federated service domains in the system.

3. The system of claim 1, wherein a locally provided service is composed with a service requester to form a mediation s/r, where s is a provided service component and r is a service requester component.

4. The system of claim 1, wherein an entry for a locally provided service in the registry comprises a list of dependent service domains, each dependent service domain containing in its registry a fulfilled reference including a description of this provided service.

5. A method for matching interest and availability of services in a service-oriented environment, the method comprising steps of:
  instantiating two or more service domains, each service domain configured to send and receive interest, availability and connectivity messages to and from other service domains;
  sending from a service domain an availability message for a service s1 to other domains, wherein the availability message comprises a description of the service s1 to match with, and a reference to its domain, and wherein the service domain locally registers availability of the service s1, and waits to hear for interest in the service s1;
  receiving at the service domain an interest message, wherein the interest message comprises a description of the service s1 to match with, and a reference to the sender domain, the service domain then sending a connectivity message to the sender domain, if the service s1 is locally available, where the connectivity message comprises a proxy to the locally provided service s1;
  sending from the service domain an interest message for a service s2 to other domains, wherein the interest message comprises a description of the service s2 to match with, and a reference to its domain, wherein the service domain locally registers an unfulfilled reference to the service s2, and waits to hear for a connectivity message for the service s2;
  receiving at the service domain an availability message, wherein the availability message comprises a description of the service s2 to match with, and a reference to the sender domain, wherein the service domain then sends an interest message for the service s2 to the sender domain, if an unfulfilled reference to the service s2 is registered locally, wherein the interest message comprises a description of the service s2 to match with, and a reference to its domain; and
  receiving at the service domain a connectivity message, wherein the connectivity message comprises a proxy to the foreign provided service s2, wherein the service domain then replaces the unfulfilled reference to the service s2 with the proxy to the service s2 in its local registry;
  wherein each of the steps is implemented via one or more processor devices.

6. The method of claim 5, wherein the step of the service domain receiving a connectivity message further comprises replacing the unfulfilled reference to the service s2 with a single proxy or keeping the reference as unfulfilled and collecting multiple proxies, depending on whether the reference may be fulfilled once or multiple times.

7. The method of claim 5, wherein the description of the service s1 or s2 comprises a functional interface, a non-functional criterion, or informal semantics.

8. The method of claim 5, wherein the step of the service domain waiting to hear for a connectivity message for the service s2 further comprises timing out after a configurable amount of time and sending further interest messages until interest is fulfilled.

9. The method of claim 5, wherein the service domain sends an interest, availability, or connectivity message to any subset of service domains maintained in the service-oriented environment.

10. The method of claim 5, wherein the step of the service domain sending an availability message for the service s1, where the service s1 is composed into a mediation s1/r, happens after interest for the mediation's requester component r is fulfilled, such that when the service s1 is a component of a mediation s1/r, the service domain sends interest for r first, and availability of s1 is not sent until the service domain receives a connectivity message for r.

11. The method of claim 5, wherein the step of the service domain receiving an interest message for a service s1 further comprises the service domain adding a reference to a list of dependent service domains for the service s1.

12. An article of manufacture comprising a non-transitory computer readable storage medium tangibly embodying computer readable program code which, when executed by a computer, causes the computer to carry out the steps of claim 5.

13. A method for matching negative interest and negative availability of services in a service-oriented environment, the method comprising steps of:
  instantiating two or more service domains, each service domain configured to send and receive negative availability messages to and from other service domains;
  sending from a service domain a negative availability message for a service to other domains, wherein the negative availability message comprises a description of the service to match with, and a reference to its domain; and
  receiving at the service domain a negative availability message, wherein the negative availability message comprises a description of a service to match with, and a reference to the sender domain, and wherein the service domain then replaces a fulfilled reference to the service with an unfulfilled reference to the service, if a fulfilled reference to the service is registered locally, and sends an interest message for the service to other domains;
  wherein each of the steps is implemented via one or more processor devices; and
  wherein the description of the service comprises a functional interface, a non-functional criterion, or informal semantics.

14. The method of claim 13, wherein, when negative interest in a service occurs in the service domain, the service domain removes its reference to the service, fulfilled or unfulfilled, from its local registry, if said reference to the service is registered locally.

15. The method of claim 13, wherein in the step of the service domain sending negative availability for the service, the message is sent to each service domain in a list of dependent service domains for the service.

16. An article of manufacture comprising a non-transitory computer readable storage medium tangibly embodying computer readable program code which, when executed by a computer, causes the computer to carry out the steps of claim 13.

17. Apparatus for use in a service-oriented environment, the apparatus comprising:
- a memory associated with an instantiated service domain; and
- at least one processor device associated with the instantiated service domain, coupled to the memory, and configured to:
- send from the service domain an availability message for a service s1 to one or more other instantiated service domains in the service-oriented environment, wherein the availability message comprises a description of the service s1 to match with, and a reference to its domain, and wherein the service domain is caused to locally register availability of the service s1, and to wait to hear for interest in the service s1;
- receive at the service domain an interest message, wherein the interest message comprises a description of the service s1 to match with, and a reference to the sender domain, and cause the service domain to then send a connectivity message to the sender domain, if the service s1 is locally available, where the connectivity message comprises a proxy to the locally provided service s1;
- send from the service domain an interest message for a service s2 to other domains, wherein the interest message comprises a description of the service s2 to match with, and a reference to its domain, wherein the service domain is caused to locally register an unfulfilled reference to the service s2, and waits to hear for a connectivity message for the service s2;
- receive at the service domain an availability message, wherein the availability message comprises a description of the service s2 to match with, and a reference to the sender domain, wherein the service domain is then caused to send an interest message for the service s2 to sender domain, if an unfulfilled reference to the service s2 is registered locally, wherein the interest message comprises a description of the service s2 to match with, and a reference to its domain; and
- receive at the service domain a connectivity message, wherein the connectivity message comprises a proxy to the foreign provided service s2, wherein the service domain is then caused to replace the unfulfilled reference to the service s2 with the proxy to the service s2 in its local registry.

18. The apparatus of claim 17, wherein the service domain is further caused to replace the unfulfilled reference to the service s2 with a single proxy or keep the reference as unfulfilled and collect multiple proxies, depending on whether the reference may be fulfilled once or multiple times.

19. Apparatus for use in a service-oriented environment, the apparatus comprising:
- a memory associated with an instantiated service domain; and
- at least one processor device associated with the instantiated service domain, coupled to the memory, and configured to:
- send from the service domain a negative availability message for a service to one or more other instantiated service domains in the service-oriented environment, wherein the negative availability message comprises a description of the service to match with, and a reference to its domain; and
- receive at the service domain a negative availability message, wherein the negative availability message comprises a description of a service to match with, and a reference to the sender domain, and wherein the service domain is caused to replace a fulfilled reference to the service with an unfulfilled reference to the service, if a fulfilled reference to the service is registered locally, and send an interest message for the service to other domains;
- wherein the description of the service comprises a functional interface, a non-functional criterion, or informal semantics.

20. The apparatus of claim 19, wherein, when negative interest in a service occurs in the service domain, the at least one processor device is further configured to cause the service domain to remove its reference to the service, fulfilled or unfulfilled, from its local registry, if said reference to the service is registered locally.

21. The apparatus of claim 19, wherein when the service domain is caused to send negative availability for the service, the message is sent to each service domain in a list of dependent service domains for the service.

* * * * *